(12) United States Patent
Roychoudhury et al.

(10) Patent No.: US 6,682,095 B2
(45) Date of Patent: Jan. 27, 2004

(54) NON-SAFETY VEHICLE SYSTEMS CONTROL USING OCCUPANT CLASSIFICATION

(75) Inventors: Raj S. Roychoudhury, Bloomfield Hills, MI (US); John O'Neill, Clarkston, MI (US)

(73) Assignee: Breed Automotive Technology, Inc., Lakeland, FL (US)

( * ) Notice: Subject to any disclaimer, the term of this patent is extended or adjusted under 35 U.S.C. 154(b) by 0 days.

(21) Appl. No.: 10/176,006

(22) Filed: Jun. 21, 2002

(65) Prior Publication Data

US 2003/0234524 A1 Dec. 25, 2003

(51) Int. Cl.$^7$ .............................................. B60R 21/32
(52) U.S. Cl. ........................................ 280/735; 701/45
(58) Field of Search ...................... 280/735; 701/45–47

(56) References Cited

U.S. PATENT DOCUMENTS

| | | | | |
|---|---|---|---|---|
| 4,811,226 A | | 3/1989 | Shinohara .............. 364/242.05 |
| 5,081,586 A | * | 1/1992 | Barthel et al. ................ 701/49 |
| 5,244,252 A | * | 9/1993 | Serber .................. 297/216.19 |
| 5,245,694 A | * | 9/1993 | Zwern ........................ 704/200 |
| 5,524,439 A | * | 6/1996 | Gallup et al. .................. 62/3.5 |
| 5,602,425 A | * | 2/1997 | Wilhelmi et al. ........... 307/10.1 |
| 5,670,853 A | * | 9/1997 | Bauer ......................... 318/286 |
| 5,802,479 A | * | 9/1998 | Kithil et al. ................... 701/45 |
| 5,986,357 A | * | 11/1999 | Myron et al. ............... 307/116 |
| 5,991,669 A | * | 11/1999 | Dominke et al. .............. 701/1 |
| 6,009,355 A | * | 12/1999 | Obradovich et al. ........... 701/1 |
| 2001/0045733 A1 | * | 11/2001 | Stanley et al. .............. 280/735 |
| 2002/0056056 A1 | * | 5/2002 | Bannatyne et al. ........... 714/25 |
| 2002/0156564 A1 | * | 10/2002 | Preston et al. ................ 701/70 |

\* cited by examiner

*Primary Examiner*—Charles T. Jordan
*Assistant Examiner*—Bret Hayes
(74) *Attorney, Agent, or Firm*—Patrick J. G. Steinnon; Lonnie Drayer

(57) ABSTRACT

Energy is conserved utilizing information collected by a vehicle safety system. Information concerning whether seats other than the driver's seat are occupied and information concerning the size and weight of any occupants present, is transferred to a power load logic via a vehicle information data bus, or by a hard wired communication link. Power is conserved by turning off energy consuming functions which are specific to an unoccupied seat, or by modulating power consuming functions in proportion to the size and weight of the seat occupant.

9 Claims, 1 Drawing Sheet

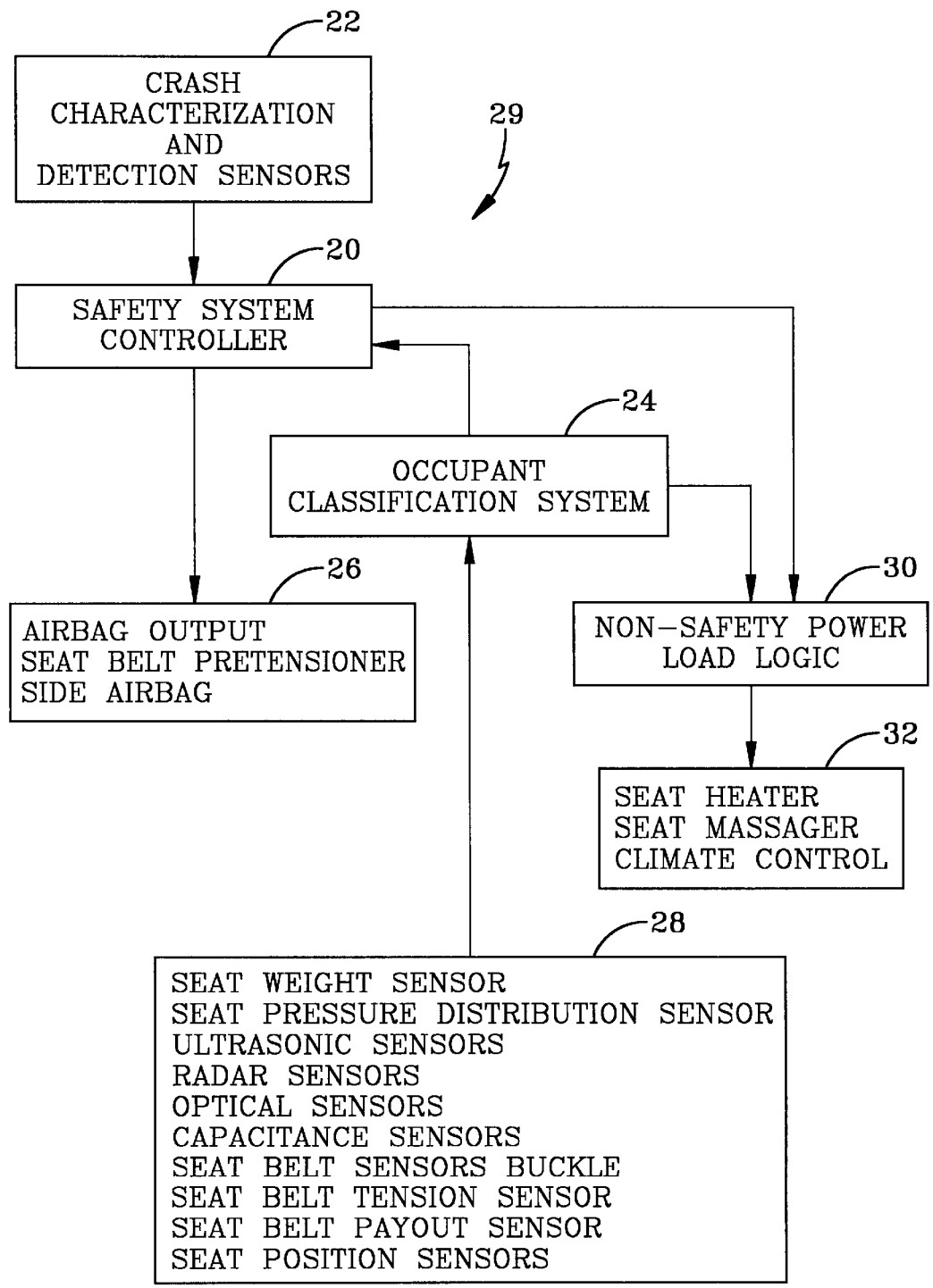

NON-SAFETY VEHICLE SYSTEMS CONTROL USING OCCUPANT CLASSIFICATION

BACKGROUND OF THE INVENTION

The present invention relates to systems for reducing power consumption of accessory power systems, such as seat heaters, air conditioning, and seat back massage.

The modern car or truck which incorporates an airbag may also have a system for detecting the presence and position and weight of vehicle occupants. Considerable cost savings may be achieved by not deploying an airbag during a crash where it is not needed because no occupant is present with respect to a particular airbag. In addition, it has been discovered that in some circumstances deployment of an airbag should be adjusted in force or foregone altogether to maximize passenger safety. The circumstances under which, and the force with which an airbag deploys, relates to the size and weight of the seat occupant, and whether the seat occupant is properly positioned with respect to the airbag, so as not to be harmed by the airbag deployment itself.

Seat position sensors are suggested by U.S. Pat. No. 4,811,226 for use in optimally adjusting the angular position of vehicle equipment such as fender mirrors, interior mirrors, blowing ports of an air conditioner, speakers, and instrument meters, with respect to a vehicle occupant.

What is needed is a way to use vehicle seat occupant information available to the safety system to improve the operation of other vehicle systems to save energy.

SUMMARY OF THE INVENTION

The system and method for conserving energy of this invention utilizes information collected by a part of the vehicle safety system known as an occupant classification system. The occupant classification system provides information concerning whether seats other than the driver's seat are occupied and provides information concerning the size and weight of any occupant present. A non-safety power load logic receives information from the occupant classification system and uses this information to reduce unnecessary power loads such as the amount of vehicle air-conditioning, seat heating, or seat back massage. Information may be transferred between the occupant classification system and a non-safety power load logic via a vehicle information data bus, or by a hard wired communication link. Power is reduced by turning off energy consuming functions which are specific to an unoccupied seat, or by modulating a power consuming function in proportion to the size or weight of the seat occupant.

It is a feature of the present invention to utilize information collected for safety purposes to conserve vehicle power.

It is a further feature of the present invention to utilize information collected for safety purposes to modulate the amount of energy consumed by non-safety systems.

Further features and advantages of the invention will be apparent from the following detailed description when taken in conjunction with the accompanying drawings.

BRIEF DESCRIPTION OF THE DRAWINGS

The FIGURE is a block diagram of a vehicle safety system, an occupant classification sensing system, a vehicle comfort zone control system and their interrelationship.

DETAILED DESCRIPTION OF THE INVENTION

Referring more particularly to the FIGURE, a safety system controller 20 receives input from crash characterization and detection sensors 22 and an occupant classification system 24. The safety system controller 20 typically is based on a microprocessor that receives information from crash detection sensors, and from sensors that characterize a crash as it is occurring. Some of the sensors may be mounted to detect the early onset of a crash, and some sensors may even be mounted with or co-formed with the microprocessor. The microprocessor executes a system logic that utilizes a pre-programmed logic to decide if when and how an airbag 26, or other safety device, should be deployed.

The microprocessor which forms the safety system controller 20 also receives input from the occupant classification system 24. The occupant classification system 24 typically is based on a separate microprocessor and receives input from a range of sensors 28 that characterize the presence and location of occupants within the vehicle. The size, weight, and position of a seat occupant are used to adjust the way a safety device deploys or whether it is deployed at all. In particular, if the seat occupant is too close to the airbag, the safety system 29, which includes the crash sensors, the safety system controller, and the occupant classification system, may dictate that the airbag not deploy. When there is no occupant opposite an airbag, the safety system will direct that the airbag not be deployed to save the costs associated with unnecessarily replacing an airbag. The occupant classification system can use a wide range of sensors, such as ultrasonic sensors, seat weight sensors, optical sensors, radar sensors, capacitance sensors, seat pressure sensors, seat belt buckle sensors, seat belt tension sensors, seatbelt payout sensors, seat position sensors these sensors can be used separately or in combination, to characterize the presence, size, weight, and position of an occupant with respect to one or more safety devices.

The information gathered by the occupant classification system can also be used to determine a more narrow range of attributes useful for controlling power demand, specifically the presence, and weight of an occupant and so enable control of the power demands of vehicle subsystems, based on occupant presence, and weight. Determining a seat occupant weight typically involves using a number of sensors to arrive at an accurate estimation. Seat weight sensors are the starting point, however the seat position, seatbelt payout, and the various other sensors such as pressure profile, ultrasonic, radar, etc. are useful in improving and verifying the value determined by the seat weight sensors. Information from the occupant classification system 24 is sent to a non-safety power load logic 30 over a vehicle data bus or by individual wires. Information may be sent directly from the classification system 24 or indirectly from the safety system controller 20. The non-safety power load logic 30 controls those power consuming devices 32 which are related to the occupant of a particular seat. If a particular vehicle seat is not occupied, power consuming functions such as a seat heater are shut off, or inhibited against accidental actuation. The power loads which are related to a particular seat are controlled, so that the power load is seat specific, and thus can be related to the absence or presence, and if present the attributes of an occupant of a particular seat.

Certain functions, particularly seat heaters, can consume relatively large amounts of power. A car seat heater that consumes only 500 Watts, can, after accounting for inefficiencies in the generation of electricity, require almost 1 hp of engine power. The non-safety power load logic can operate in proportional fashion responding to those inputs from the occupant classification system 24 that are themselves proportional, for example the total amount of seat heating, and the concentration of that heating could be varied in response to the weight of the seat occupant. Thus if the occupant classification system 24 indicates that a child is occupying the seat a lesser amount of seat heating concentrated in the center of the seat might obtain the benefits of seat heating while substantially reducing the amount of power consumed. In a similar way the amount of vibration applied to a car seat when a car seat massager is actuated could be scaled to the weight of a car seat occupant, thus conserving power.

It should be understood that the safety system 29 is defined as a system that includes and controls the deployment of: airbags, seat belt tensioners and other safety actions taken during a crash. It should further be understood that the safety system controller, the occupant classification system, and the non-safety power load logic could be three separate components based on three separate microprocessors as shown in the drawing, or could be combined so that one or two devices performed all the functions assigned to the safety system controller, the occupant classification system and the non-safety power load logic.

It should be understood that when a power load is described as being proportional to one variable attribute, proportionality may be direct or inverse, and linear or non-linear or even a step function. Proportionality thus means, for example, as the measured weight of a seat occupant increases, more power is supplied to the seat heating system, even though increases in seat heating may take place in discrete steps, for example if different heating coils are turned on as the measured weight exceeds various values.

It should be understood that a seat specific power load, is a power load which is identifying to one or more vehicle seats in contrast to a power load which is not varied depending on the number and position of occupants.

It is understood that the invention is not limited to the particular construction and arrangement of parts herein illustrated and described, but embraces all such modified forms thereof as come within the scope of the following claims.

We claim:

1. A vehicle incorporating a power conserving system comprising:
    a vehicle safety system including at least one airbag;
    an occupant classification system forming part of the vehicle safety system and including at least one sensor which detects when an occupant is present;
    a safety system controller forming part of the vehicle safety system, the safety system controller in information receiving relation with the occupant classification system, and in deployment controlling relation with the vehicle safety system, including the at least one airbag;
    at least one non-safety power consuming system; and
    a non-safety system power controller in controlling relation to the at least one non-safety power consuming system, and in information receiving relation to the occupant classification system, the non-safety system operable to control the amount of power consumed by the at least one non-safety power consuming system based on information received from the occupant classification system.

2. The vehicle of claim 1 wherein the occupant classification system provides a value corresponding to a variable attribute of an occupant, and wherein the non-safety system power controller is in proportional controlling relation to allow the at least one non-safety power consuming system to control the non-safety power consuming system power consumption in proportion to the variable attribute as provided by of the occupant classification system.

3. The vehicle of claim 1 wherein the occupant classification system provides a value corresponding to a weight of an occupant, and wherein the non-safety system power controller is in proportional controlling relation to allow the at least one non-safety power consuming system to control the non-safety power consuming system power consumption in proportion to the occupant weight as provided by the occupant classification system.

4. The vehicle of claim 1 wherein the occupant classification system includes at least one sensor selected from the group consisting of ultrasonic sensors, seat weight sensors, optical sensors, radar sensors, capacitance sensors, seat pressure sensors, seat belt tension sensors, and seat belt payout sensor.

5. The vehicle of claim 1 wherein the at least one non-safety power consuming system is selected from the group consisting of a seat heater, a seat massage apparatus, and vehicle air-conditioning.

6. A method of conserving power use in a vehicle comprising the steps of:
    communicating vehicle occupant presence data, and occupant absence data from a data collection system forming part of a safety system to a system capable of controlling power supplied to at least one seat specific power load;
    analyzing power need of said at least one seat specific power load based on the presence or absence of an occupant in a seat in connection with the at least one seat specific power load; and
    controlling the power supplied to the at least one seat specific power load in accordance with the analyzed power need of said at least one seat specific power load.

7. The method of claim 6 wherein the step of analyzing power need further comprises the step of, on condition that the occupant is present, monitoring at least one variable attribute of the vehicle occupant and modulating the power supplied to the at least one seat specific power load proportional to the variable attribute.

8. The method of claim 7 wherein the variable attribute is occupant weight, and the at least one seat specific power load is seat heating.

9. A method of conserving power use in a vehicle comprising the steps of:
    communicating a magnitude of at least one variable attribute related to a vehicle occupant from a data collection system forming part of a safety system, to a system capable of controlling power supply to at least one seat specific power load;
    analyzing power need of said at least one seat specific power load based on the at least one variable attribute in connection with the at least one seat specific power load; and
    controlling the power supplied to the at least one seat specific power load so as to be proportional to the magnitude of the at least one variable attribute.

* * * * *